June 7, 1927.

W. MURPHY

TIRE CHAIN

Filed Sept. 17, 1926

1,631,754

INVENTOR:
William Murphy
BY David E. Carlsen
ATTORNEY.

Patented June 7, 1927.

1,631,754

UNITED STATES PATENT OFFICE.

WILLIAM MURPHY, OF ST. LOUIS PARK, MINNESOTA.

TIRE CHAIN.

Application filed September 17, 1926. Serial No. 136,015.

My invention relates to an emergency or antiskid chain for use on the ground wheels of motor vehicles and the object is to provide a simple, efficient and inexpensive chain of said kind which can be easily placed on the drive wheels for emergencies such as pulling out of muddy places. A further object is to provide a chain with tension means adapted to hold the chain close against a tire and thus prevent noises and damage resulting from loose chains.

Figure 1:
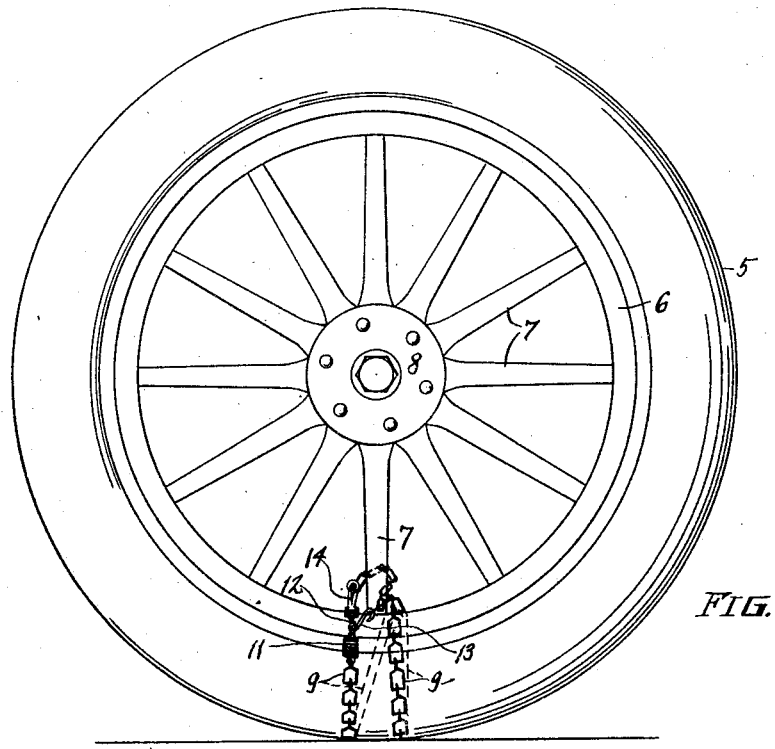
Fig. 1 is a side elevation of an automobile wheel with a pneumatic tire on it and one of my devices in operative position on said wheel and tire.
Figure 2:
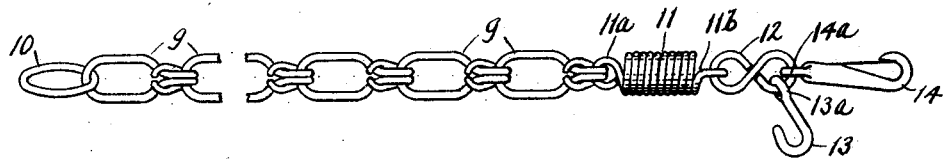
Fig. 2 is an enlarged elevation of one of my improved chains as it appears before being placed on a wheel.

Referring to the drawing by reference numerals 5 designates a tire of a motor vehicle drive wheel comprising the wheel rim or felly 6, spokes 7 and hub 8.

My chain device comprises a predetermined length of chain comprising links 9 of any suitable, durable construction, for example a heavy wire chain with elongated loops as shown. 10 is a heavy ring in one of the end links 9. In the other end link of chain 9 I secure the looped end 11ª of a heavy close-coil spiral spring 11 the opposite end of the latter having another loop 11ᵇ engaging one end of a preferably 8-shaped link 12. In the other end of said link 12 I engage the eyes 13ª and 14ª of an open hook 13 and a preferably spring closed hook 14, respectively.

The chain is wound around the tire with the spring 11 in proximity to the rim 6, where said spring is in a position free from contact with mud or sand; the hook 14 is then adjacent the outer end of one of the spokes 7. From spring 11 the chain is passed about the tire and felly to a point on the opposite side of spoke 7 from hook 14, then continued as a second loop about the tire and brought up close to the said spoke, where one of the links is engaged with the open hook 13 and any links beyond this hooked link are passed around the spoke 7 (see Fig. 1) and the end link of the chain engaged in the snap hook 14. It will be readily understood that the chain should be circled about the tire and rim snugly and that the link used to connect with hook 13 is engaged only after stretching the spring 11 and thus insuring a taut condition of the chain and reducing the tendency of the chain to creep on the tire. Hooking the free end of the chain to snap-hook 14 after passing it around the spoke takes care of any surplus chain and prevents same from flying around loosely when the wheel is in motion.

It is obvious that my chain device may be provided in various lengths to encircle the tire and rim completely two or more times. Any number of them may be put on a wheel, three or four to a wheel usually being enough to provide added traction or road gripping effect to get a motor vehicle out of a mud hole or off of slippery ground. When a motor vehicle has become mired in mud or soft ground with its wheels dug partially into the ground it is obvious that these devices may be put on the upper or accessible parts of the drive wheels, the motor used to turn the wheels some more and more devices put on to that part of the wheels previously in the mud. Thus any required number may be put on the drive wheels so that the motor vehicle can pull itself out of the mud hole and no lifting jacks, planking and other means are needed.

What I claim is:

In an antiskid and traction device of the class described, a length of chain, a tension element attached to one end of said chain, a single chain link attached to the opposite end of said tension element, a pair of hooks engaging said latter link, said chain adapted to be coiled about a wheel rim and tire and one link of the chain engaged with one of said hooks to partly expand said tension element and create a taut condition of the coiled chain.

In testimony whereof I affix my signature.

WILLIAM MURPHY.